US006813137B2

(12) United States Patent
Matsuoka et al.

(10) Patent No.: US 6,813,137 B2
(45) Date of Patent: Nov. 2, 2004

(54) CHIP SHAPED ELECTRONIC DEVICE AND A METHOD OF PRODUCING THE SAME

(75) Inventors: Dai Matsuoka, Tokyo (JP); Hidetaka Kitamura, Tokyo (JP); Tadashi Ogasawara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/694,802

(22) Filed: Oct. 29, 2003

(65) Prior Publication Data

US 2004/0169267 A1 Sep. 2, 2004

(30) Foreign Application Priority Data

Oct. 29, 2002 (JP) ....................................... 2002-313772
Mar. 28, 2003 (JP) ....................................... 2003-091476

(51) Int. Cl.$^{7}$ ................................................ H01G 4/008
(52) U.S. Cl. ....................... 361/305; 361/303; 29/25.41
(58) Field of Search ................................ 361/303, 305, 361/306.3, 311–313

(56) References Cited

FOREIGN PATENT DOCUMENTS

| | | |
|---|---|---|
| JP | 9-246017 | 9/1997 |
| JP | 2001-164406 | 6/2000 |
| JP | 2000-269003 | 9/2000 |
| JP | 2001-23805 | 1/2001 |
| JP | 2001-143910 | 5/2001 |
| WO | WO 94/094999 | 4/1994 |

*Primary Examiner*—Anthony Dinkins
(74) *Attorney, Agent, or Firm*—Oliff & Berridge, PLC

(57) ABSTRACT

A chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of Li and Zn, (Li/Zn), in a range from the surface of the element body to a depth of (0.9×1) by a secondary ion mass spectrometry (SIMS), 0.001≦(Li/Zn)≦500. According to the invention, it is possible to provide a chip shaped electronic device, such as a multilayer chip varistor, not requiring glass coating or other insulative protective layer, being tolerant of temperature changes, capable of maintaining high resistance of an element surface even by reflow soldering, being highly reliable, and capable of being easily produced, and a method of producing the same.

29 Claims, 4 Drawing Sheets

CHIP SHAPED ELECTRONIC DEVICE AND A METHOD OF PRODUCING THE SAME

BACKGROUND OF THE INVENTION

1. Field of the Invention

The present invention relates to a chip shaped electronic device, such as a multilayer chip varistor, not requiring glass coating or other insulative protective layers, being tolerant of temperature changes, capable of maintaining high resistance of an element surface even in reflow soldering, being highly reliable, and can be easily produced, and a method of producing the same.

2. Description of the Related Art

In recent years, along with electronic devices becoming more compact and furthermore highly performing, chip shaped electronic devices have become essential. A chip shaped electronic device is normally arranged on a circuit substrate and subjected to heat treatment together with printed solder to form a circuit. This heat treatment is called reflow soldering processing. At this time, a flux having a strong reducing power is included in the solder, and a surface of the chip device is corroded thereby to end up declining insulative resistance in some cases.

A multilayer varistor is not exceptional as a chip shaped electronic device, and an element surface of the multilayer chip varistor is reduced by reflow soldering to bring disadvantages of declining insulative resistance and declining reliability.

To solve the disadvantages, a glass is coated on the element surface of a multilayer chip varistor for improving reliability (for example, refer to the patent article 1).

However, to cover the element surface by uniformly coating a glass takes much trouble. Also, since thermal expansion coefficients of a ceramic material and a glass material are different, the boundary is liable to be damaged by a temperature cycle, etc. Therefore, cracks may arise in a glass layer, and insulation of ceramic composing the element may be damaged.

Note that a method of diffusing Li or Na on the element surface to make the surface highly resistant has been proposed (refer to the patent article 2). In the invention described in this patent article, the ratio of SIMS ion intensity M1 of Li or Na on the element surface and SIMS ion intensity M2 of Li or Na of a portion at a depth of 10 $\mu$m from the surface is made to be $10 \leqq (M1/M2) \leqq 50000$.

In this method, however, it was found that although imperfect appearance at the time of electric plating could be improved, it was not sufficient for reducing from a flux in the reflow soldering. Namely, since a reducing power of an activated flux at the time of reflow soldering was much larger than that of electric soldering, a thickness of 10 $\mu$m or so of a range dispersed with Li or Na was not sufficient for reflow soldering.

Note that further compact electronic devices are demanded recently, and micro size chip shaped electronic devices having a size of, for example, 0.6 mm or less×0.3 mm or less×a thickness of 0.3 mm or less have been under development.

Patent Article 1: Japanese Unexamined Patent Publication No. 6-96907

Patent Article 2: Japanese Unexamined Patent Publication No. 9-246017

SUMMARY OF THE INVENTION

An object of the present invention is to provide a chip shaped electronic device, such as a multilayer chip varistor, not requiring glass coating or other insulative protective layers, being tolerant of temperature changes, capable of maintaining high resistance of an element surface even in reflow soldering, being highly reliable, and can be easily produced, and a method of producing the same.

Also, another object of the present invention is to provide a micro chip shaped electronic device (for example, having a size of 0.6 mm or less×0.3 mm or less×a thickness of 0.3 mm or less) having the above characteristics and a method of producing the same.

Chip Shaped Electronic Device

To attain the above objects, according to a first aspect of the present invention, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of an alkali metal (A) and zinc (Zn), (A/Zn), in a range from the surface of the element body to a depth of (0.9×1) by a secondary ion mass spectrometry (SIMS), $0.001 \leqq (A/Zn) \leqq 500$.

In the first aspect, configurations of respective aspects described below are preferably applied.

According to the second aspect, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of Li and Zn, (Li/Zn), in a range from the surface of the element body to a depth of (0.9×1) by a secondary ion mass spectrometry, $0.001 \leqq (Li/Zn) \leqq 500$.

According to the third aspect, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of Na and Zn, (Na/Zn), in a range from the surface of the element body to a depth of (0.9×1) by a secondary ion mass spectrometry, $0.001 \leqq (Na/Zn) \leqq 100$.

According to a fourth aspect, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of K and Zn, (K/Zn), in a range from the surface of the element body to a depth of (0.9×1) by a secondary ion mass spectrometry, $0.001 \leqq (K/Zn) \leqq 100$.

According to a fifth aspect, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of Rb and Zn, (Rb/Zn), in a range from the surface of the element body to a depth of (0.9×1) by a secondary ion mass spectrometry, 0.001≦(Rb/Zn)≦100.

According to a sixth aspect, there is provided a chip shaped electronic device comprising an element body including zinc oxide material layers and internal electrode layers, wherein when assuming a minimum distance from an outermost side of the internal electrode layer in the stacking direction to a surface of the element body is 1 and measuring an ion intensity ratio of Cs and Zn, (Cs/Zn), in a range from the surface of the element body to a depth of (0.9×1) by a secondary ion mass spectrometry, 0.001≦(Cs/Zn)≦100.

In the first aspect, configurations of respective aspects described below are preferably applied.

According to a seventh aspect, there is provided a chip shaped electronic device comprising an element body including zinc oxide material layers and internal electrode layers, wherein when measuring an ion intensity ratio of Li and Zn, (Li/Zn), in a range from the surface of the element body to a depth of 100 μm by a secondary ion mass spectrometry, it is 0.001≦(Li/Zn)≦500.

According to an eighth aspect, there is provided a chip shaped electronic device comprising an element body including zinc oxide material layers and internal electrode layers, wherein when measuring an ion intensity ratio of Na and Zn, (Na/Zn), in a range from the surface of the element body to a depth of 100 μm by a secondary ion mass spectrometry, it is 0.001≦(Na/Zn)≦100.

According to a ninth aspect, there is provided a chip shaped electronic device comprising an element body including zinc oxide material layers and internal electrode layers, wherein when measuring an ion intensity ratio of K and Zn, (K/Zn), in a range from the surface of the element body to a depth of 100 μm by a secondary ion mass spectrometry, it is 0.001≦(K/Zn)≦100.

According to a tenth aspect, there is provided a chip shaped electronic device comprising an element body including zinc oxide material layers and internal electrode layers, wherein when measuring an ion intensity ratio of Rb and Zn, (Rb/Zn), in a range from the surface of the element body to a depth of 100 μm by a secondary ion mass spectrometry, it is 0.01≦(Rb/Zn)≦100.

According to an eleventh aspect, there is provided a chip shaped electronic device comprising an element body including zinc oxide material layers and internal electrode layers, wherein when measuring an ion intensity ratio of Cs and Zn, (Cs/Zn), in a range from the surface of the element body to a depth of 100 μm by a secondary ion mass spectrometry, it is 0.1≦(Cs/Zn)≦100.

Also, there is provided a chip shaped electronic device comprising an element body including zinc oxide material layers and internal electrode layers, wherein when measuring an ion intensity ratio of an alkali metal (A) and zinc (Zn), (A/Zn), in a range from the surface of the element body to a depth of 100 μm by a secondary ion mass spectrometry, it is 0.001≦(A/Zn)≦500.

In the first aspect, configurations of respective aspects described below are preferably applied.

According to a twelfth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane (a gap between terminals) is 50 μm or more;

wherein when assuming a minimum distance from an outermost side of the internal electrode layer in the stacking direction to a surface of the element body is 1 and measuring an ion intensity ratio of Li and Zn, (Li/Zn), in a range from the surface of the element body to a depth of (0.9×1) by a secondary ion mass spectrometry (SIMS), it is 0.001≦(Li/Zn)≦500.

According to a thirteenth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of the internal electrode layer in the stacking direction to a surface of the element body is 1 and measuring an ion intensity ratio of Na and Zn, (Na/Zn), in a range from the surface of the element body to a depth of (0.9×1) by a secondary ion mass spectrometry, it is 0.001≦(Na/Zn)≦100.

According to a fourteenth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of the internal electrode layer in the stacking direction to a surface of the element body is 1 and measuring an ion intensity ratio of K and Zn, (K/Zn), in a range from the surface of the element body to a depth of (0.9×1) by a secondary ion mass spectrometry, it is 0.001≦(K/Zn)≦100.

According to a fifteenth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of the internal electrode layer in the stacking direction to a surface of the element body is 1 and measuring an ion intensity ratio of Rb and Zn, (Rb/Zn), in a range from the surface of the element body to a depth of (0.9×1) by a secondary ion mass spectrometry, it is 0.001≦(Rb/Zn)≦100.

According to a sixteenth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of the internal electrode layer in the stacking direction to a surface of the element body is 1 and measuring an ion intensity ratio of Cs and Zn, (Cs/Zn), in a range from the surface of the element body to a depth of (0.9×1) by a secondary ion mass spectrometry, it is 0.001<(Cs/Zn)<100.

According to a seventeenth aspect, there is provided a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of the internal electrode layer in the stacking direction to a surface of the element body is 1 and measuring an ion intensity ratio of an alkali metal (A) and zinc (Zn), (A/Zn), in a range from the surface of the element body to a depth of (0.9×1) by a secondary ion mass spectrometry, it is 0.001≦(A/Zn)≦500.

In the seventh and twelfth aspects, preferably, the ion intensity ratio is 0.01≦(Li/Zn)≦500.

A Method of Producing Chip Shaped Electronic Device

To attain the above aspects, according to a first aspect of the present invention, there is provided a method of producing a chip shaped electronic device comprising an element body including zinc oxide material layers and internal electrode layers, and a pair of terminal electrodes formed on an outer surface of the element body, including the steps of:

forming the element body;

diffusing an alkali metal (A) from a surface of the element body to inside the element body; and after that, forming on the outer surface of the element body the pair of terminal electrodes connected to the internal electrode layers;

wherein the alkali metal is diffused under a condition of attaining 0.001≦(A/Zn)≦500 when assuming a minimum distance from an outermost layer side of the internal electrode layers in the stacking direction to the surface of the element body is 1 at the time of diffusing the alkali metal and measuring an ion intensity ratio of the alkali metal (A) and zinc (Zn), (A/Zn), in a range from the surface of the element body to a depth of (0.9×1) by a secondary ion mass spectrometry.

In the first aspect, configurations of respective aspects described below are preferably applied.

According to a second aspect, there is provided a method of producing a chip shaped electronic device comprising an element body including zinc oxide material layers and internal electrode layers, and a pair of terminal electrodes formed on an outer surface of the element body, including the steps of:

forming the element body;

forming on the outer surface of the element body terminal electrodes connected to the internal electrode layers; and after that, diffusing an alkali metal (A) from a surface of the element body to inside the element body;

wherein the alkali metal is diffused under a condition of attaining 0.001≦(A/Zn)≦500 when assuming a minimum distance from an outermost layer side of the internal electrode layers in the stacking direction to the surface of the element body is 1 at the time of diffusing the alkali metal and measuring an ion intensity ratio of the alkali metal (A) and zinc (Zn), (A/Zn), in a range from the surface of the element body to a depth of (0.9×1) by a secondary ion mass spectrometry.

According to a third aspect, there is provided a method of producing a chip shaped electronic device comprising an element body including zinc oxide material layers and internal electrode layers, including the steps of:

forming the element body;

diffusing an alkali metal (A) from a surface of the element body to inside the element body; and after that, forming on the outer surface of the element body terminal electrodes connected to the internal electrode layers; and wherein the alkali metal is diffused under a condition of attaining 0.001≦(A/Zn)≦500 when measuring an ion intensity ratio of the alkali metal (A) and zinc (Zn), (A/Zn), in a range from the surface of the element body to a depth of 100 μm by a secondary ion mass spectrometry.

According to a fourth aspect, there is provided a method of producing a chip shaped electronic device comprising an element body including zinc oxide material layers and internal electrode layers, including the steps of:

forming the element body;

forming on the outer surface of the element body terminal electrodes connected to the internal electrode layers; and after that, diffusing an alkali metal (A) from a surface of the element body to inside the element body;

wherein the alkali metal is diffused under a condition of attaining 0.001≦(A/Zn)≦500 when measuring an ion intensity ratio of the alkali metal (A) and zinc (Zn), (A/Zn), in a range from the surface of the element body to a depth of 100 μm by a secondary ion mass spectrometry.

According to a fifth aspect, there is provided a method of producing a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

including the steps of:

forming the element body;

diffusing an alkali metal (A) from a surface of the element body to inside the element body; and after that, forming on the outer surface of the element body the pair of terminal electrodes connected to the internal electrode layers;

wherein the alkali metal is diffused under a condition of attaining $0.001<(A/Zn)<500$ when assuming a minimum distance from an outermost layer side of the internal electrode layers in the stacking direction to the surface of the element body is 1 at the time of diffusing the alkali metal and measuring an ion intensity ratio of the alkali metal (A) and zinc (Zn), (A/Zn), in a range from the surface of the element body to a depth of (0.9×1) by a secondary ion mass spectrometry.

According to a sixth aspect, there is provided a method of producing a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

including the steps of:

forming the element body;

forming on the outer surface of the element body the pair of terminal electrodes connected to the internal electrode layers; and after that, diffusing an alkali metal (A) from a surface of the element body to inside the element body;

wherein the alkali metal is diffused under a condition of attaining $0.001 \leqq (A/Zn) \leqq 500$ when assuming a minimum distance from an outermost layer side of the internal electrode layers in the stacking direction to the surface of the element body is 1 at the time of diffusing the alkali metal and measuring an ion intensity ratio of the alkali metal (A) and zinc (Zn), (A/Zn), in a range from the surface of the element body to a depth of (0.9×1) by a secondary ion mass spectrometry.

Preferably, at the time of diffusing the alkali metal, the element body is subjected to heat treatment at a temperature of 700 to 1000° C. in a state of being applied with powder of an alkali metal compound, and at least one of an application amount of the powder to the surface of the element body, a heat treatment temperature and a heat treatment time is controlled.

Common Items

Preferably, the above alkali metal (A) is at least one of Li, Na, K, Rb and Cs.

In the present invention, while the chip shaped electronic device is not particularly limited, preferably, the above element body has the configuration of alternately stacking zinc oxide voltage nonlinear resistor layers and internal electrode layers, and the chip shaped electronic device is a multilayer chip varistor.

Operation of the Present Invention (1) The present invention is, in brief, a technique for letting single or a plurality of alkali metals, such as Li, Na, K, Rb and Cs, etc., contained in a range up to a predetermined depth including a surface of an element body including zinc oxide material layers and internal electrode layers.

(2) The present inventors found that when assuming a shortest distance from an outermost side in the stacking direction of an internal electrode layer to the surface of an element body is 1 regardless of a size of the element body in a multilayer chip varistor or other chip shaped electronic devices, and measuring an ion intensity ratio (alkali metal A/zinc Zn) of a range from the surface of the element body to a depth of (0.9×1) and the ion intensity ratio is adjusted to be in a predetermined range, a decline of an insulation resistance value due to a flux in reflow soldering can be prevented and an insulation defective rate after the reflow soldering can be widely reduced.

The state of the range from the surface of the element body (any size) wherein an alkali metal is dispersed up to the depth of (0.9×1) is not always clear, but it is considered that an alkali metal is dissolved in zinc oxide grains contained in the zinc oxide material layer positioned outside of the element body. In the present invention, by setting the ion intensity ratio to be in a predetermined range, a range from the surface of the element body to the depth (0.9×1) becomes a high resistance layer and prevents a current from leaking on the element surface due to a reducing action of a flux by the reflow soldering. Accordingly, a decline of an insulation resistance value after the reflow soldering can be prevented and the insulation defective rate can be reduced.

(3) The present inventors found that the same effects as above can be obtained by adjusting the ion intensity ratio (alkali metal A/zinc Zn) of a range from the surface of the element body to a depth of 100 μm when the size of the element body is not a micro size of, for example, more than 0.6 mm×more than 0.3 mm×a thickness of more than 0.3 mm.

Note that in a chip shaped electronic device of the present invention, M1/M2 defined in the patent article 2 becomes about 1, which is out of a range of $10 \leqq (M1/M2) \leqq 50000$ regulated in the patent article 2. However, the present inventors found for the first time that a decline of the insulation resistance value after reflow soldering can be prevented and the insulation defective rate can be reduced by setting to the range of the present invention.

(4) The present inventors also found the fact that it is preferable to apply the technique described in (2) above, not the technique in (3) particularly when the size of the element body is a micro size of, for example, 0.6 mm or less×0.3 mm or less×a thickness of 0.3 mm or less. When applying the technique in the above (3) as it was to a chip wherein a size of the element body was a micro size, it was found that disadvantages below arose. Generally, a multilayer chip varistor as an example of chip shaped electronic devices causes varistor characteristics between two internal electrode layers adjacent to each other in the stacked direction in the element body. In the case of the above micro size chip, a distance between the internal electrode layer arranged at the outermost side among the internal electrode layers and the surface of the element body becomes less than 100 μm in some cases. In this case, when an insulation layer is formed to a range of a depth of 100 μm including the surface of the chip varistor element as proposed above, the above alkali metal sometimes diffuses even inside of the chip which is the inner side of the outermost side in the stacked direction of the internal electrode layers (between the internal electrodes causing the varistor characteristics) and electric characteristics may change by being affected thereby. Thus, when the size of the element body is a micro size, the same effect can be obtained by not applying the technique of (3) but the technique of (2).

Also, since a material having different thermal expansion coefficient, such as in the glass coating, is not used, it is tolerant of heat cycles. Also, insulation between terminals can be surely secured in a micro size chip having a narrower gap between terminals (corresponding to the reference number 5 in FIG. 4) not by glass coating or other insulation methods (not only that glass coating is hard to apply in a micro size chip shaped electronic device but, when it is applied, chip becomes roundish with the glass and affects when being mounted). Therefore, the electronic device can maintain the high reliability.

(5) Also, in the present invention, a high resistance layer is formed by adhering an alkali metal supply source on the surface of the element body and diffusing an alkali metal from the element body surface to inside thereof by heat treatment, and coating of an insulative glass layer is unnecessary as being different from the related art, so that a complicated facilities and processes are unnecessary and a highly reliable chip shaped electronic device can be produced easily at a low cost.

BRIEF DESCRIPTION OF THE DRAWINGS

These and other objects and features of the present invention will become clearer from the following description of the preferred embodiments given with reference to the attached drawings, in which.

Figure 1:
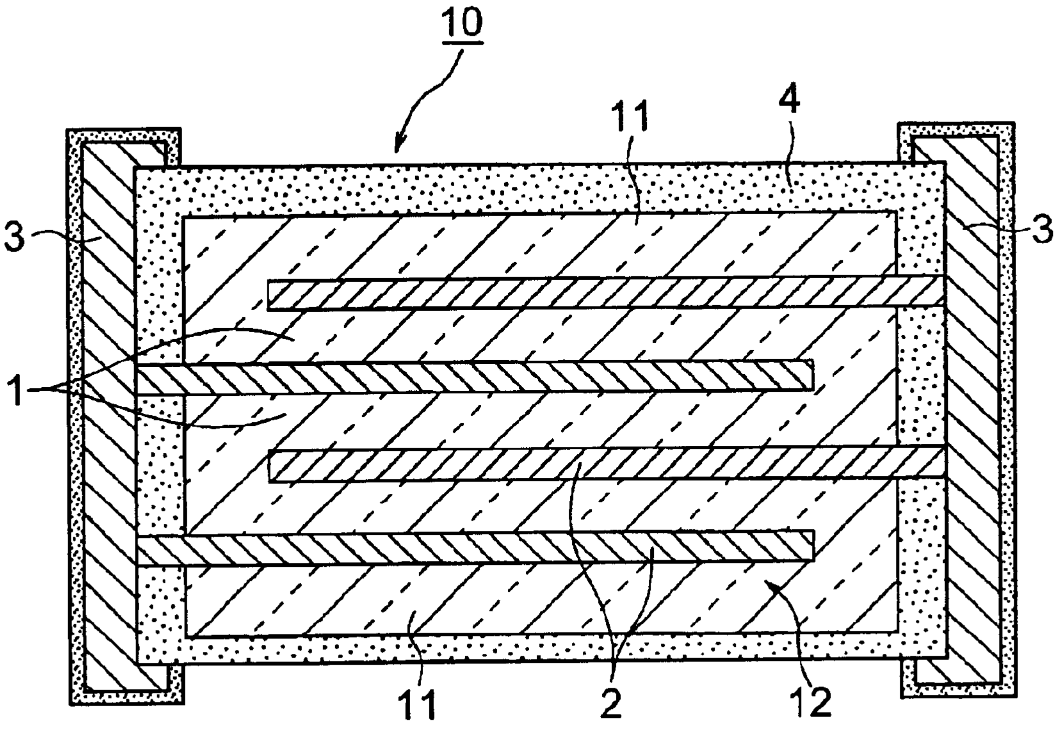
FIG. 1 is a schematic sectional view of a multilayer chip varistor according to an embodiment of the present invention.

The reference numbers are:

1, 1*a* . . . voltage nonlinear resistor layer
2, 2*a* . . . internal electrode layer
3, 3*a* . . . terminal electrode
4, 4*a* . . . high resistance layer
5 . . . gap between terminals
10, 10*a* . . . multilayer chip varistor
12, 12*a* . . . element body

DESCRIPTION OF THE PREFERRED EMBODIMENTS

Below, embodiments of the present invention will be explained based on the drawings.

First Embodiment

As shown in FIG. 1, a multilayer chip varistor 10 as an example of a chip shaped electronic device according to the present embodiment comprises an element body 12 having the configuration of alternately stacking voltage nonlinear resistor layers 1 and internal electrode layers 2. The internal electrode layers 2 alternately expose from opposing both end surfaces in the element body 12 and are respectively connected to external terminal electrodes 3 to form a varistor circuit. An outermost layer 11 is stacked outside of the internal electrode layers 2 in the stacked direction and an internal electrode layer 2 is protected. The outermost layer 11 is normally composed of the same material as that of the resistor layer 1. A material of the resistor layer 1 will be explained later. It is the same for a high resistant layer 4 formed around the element body 12.

A shape of the element body 12 is not particularly limited, but normally is a rectangular parallel shaped. In the present embodiment, a size of the element body 12 is, for example, (more than 0.6 mm and 5.6 mm or less)×(more than 0.3 mm and 5.0 mm or less)×thickness (more than 0.3 mm and 1.9 mm or less) or so.

The voltage nonlinear resistor layer 1 (the outermost layer 11, as well) is composed of a zinc oxide varistor material layer. The zinc oxide varistor material layer is composed of a material including, for example, ZnO as a main component and rare-earth elements, Co, group IIIb elements (B, Al, Ga and In), Si, Cr, alkali metal elements (K, Rb and Cs) and alkali earth metal elements (Mg, Ca, Sr and Ba), etc. as subcomponents. Alternately, it may be composed of a material including ZnO as a main component and Bi, Co, Mn, Sb and Al, etc. as subcomponents.

The main component including ZnO works as a substance of developing excellent voltage linearity in voltage—current characteristics and a large surge tolerated dose. Note that the voltage nonlinearity means a phenomenon that a current flowing to the element increases nonlinearly when applying a gradually increasing voltage to between terminal electrodes 3.

A content of ZnO as a main component in the resistor layer 1 is not particularly limited, but normally 99.8 to 69.0 wt % when assuming that the whole material composing the resistor layer 1 is 100 wt %.

A conductive material contained in the internal electrode layer 2 is not particularly limited, but is preferably composed of Pd or Ag—Pd alloy. A thickness of the internal electrode layer 2 may be suitably determined in accordance with use, but is normally 0.5 to 5 μm or so.

A conductive material contained in the external terminal electrode 3 is not particularly limited, but normally Ag or Ag—Pd alloy is used. Furthermore, a film of Ni and Sn/Pd is formed by electric plating, etc. on the surface of a base layer of Ag or Ag—Pd alloy, etc. in accordance with need. A thickness of the external terminal electrode 3 may be suitably determined in accordance with the use, but is normally 10 to 50 μm or so.

The high resistance layer 4 is formed to cover allover the outer surface of the element body 12. This high resistance layer 4 is formed by performing heat treatment on an alkali metal compound which becomes an oxide by thermal decomposition in a state of being adhered to the surface of the element body 12 and diffusing an alkali metal from the surface of the element body 12 to inside thereof.

Note that a boundary of the high resistance layer 4 and the outermost layer 11 of the element body 12 is not always clear, and a region in which the alkali metal is diffused in the outermost layer 11 becomes the high resistance layer 4. The high resistance layer 4 has a role of protecting the voltage nonlinear resistor layer 1 at the time of reflow soldering.

A thickness of the high resistance layer 4 is not particularly limited, but is at least 10 μm or more, which is a thickness of not reaching to the internal electrode layer 2. When the thickness is too thin, effects of the present invention become small, while when it is too thick, electric characteristics of the voltage nonlinear resistor layer 1 may be affected thereby.

In the high resistance layer 4, when measuring an ion intensity ratio of the alkali metal (A) and zinc (Zn), (A/Zn), in a range from the surface (the surface of the element body 12) to a depth of 100 μm by a secondary ion mass spectrometry, it becomes $0.001 \leqq (A/Zn) \leqq 500$.

Note that the ion intensity ratio can be obtained by the secondary ion mass spectrometry (SIMS). The SIMS is a method of highly sensitively measuring an ion density distribution in the depth direction from the surface layer in a micron order. When a high energy ion beam (several keV to 20 keV) is irradiated to a solid surface, atoms constituting a sample are discharged as neutrons and ions due to a sputter phenomenon. A method of analyzing elements and compounds on the sample surface by dividing secondarily discharged ions to a ratio of a mass and charges by a mass spectrometer in this way is the SIMS.

An alkali metal dispersed in the high resistance layer 4 is, while not particularly limited, preferably at least one of Li, Na, K, Rb and Cs, and more preferably, Li.

When the alkali metal is Li, the ion intensity ratio of Li and Zn, (Li/Zn), is preferably $0.001 \leqq (Li/Zn) \leqq 500$, more preferably $0.01 \leqq (Li/Zn) \leqq 500$.

When the alkali metal is Na, the ion intensity ratio of Na and Zn, (Na/Zn), is preferably $0.001 \leqq (Na/Zn) \leqq 100$.

When the alkali metal is K, the ion intensity ratio of K and Zn, (K/Zn), is preferably $0.001 \leqq (K/Zn) \leqq 100$.

When the alkali metal is Rb, the ion intensity ratio of Rb and Zn, (Rb/Zn), is preferably $0.01 \leqq (Rb/Zn) \leqq 100$.

When the alkali metal is Cs, the ion intensity ratio of Cs and Zn, (Cs/Zn), is preferably $0.1 \leqq (Cs/Zn) \leqq 100$.

When the ion intensity ratio is too small, an insulation resistance value after reflow soldering tends to be too low, while when the ion intensity ratio is too large, electric characteristics of the voltage nonlinear resistor layer 1 may be adversely affected and an increase of the insulation resistance value after reflow soldering tends to decline.

Next, a production process of a multilayer chip varistor 10 according to the present invention will be explained based on FIG. 2.

Figure 2:
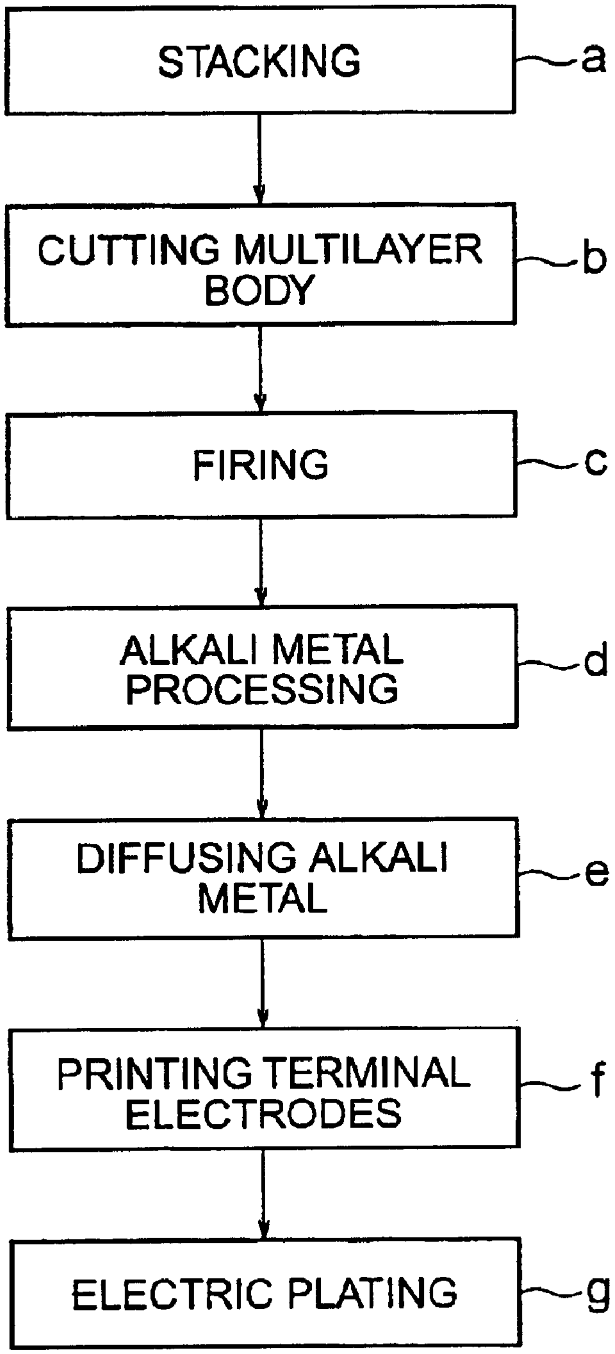
FIG. 2 is a flowchart of a production process of a multilayer chip varistor according to an embodiment of the present invention.

First, by using a printing method or a sheet method, etc., voltage nonlinear resistor layers 1 (varistor layers) and internal electrode layers 2 are alternately stacked so that every other internal electrode layers 2 are exposed to both end portions alternately, and an outermost layers 11 are stacked at both ends in the stacking direction, so that a stacked body is formed (process "a" in FIG. 2).

Next, the stacked body is cut to obtain a green chip (step "b").

Next, binder removal processing is performed in accordance with need and the green chip is fired, so that a chip element to be a chip body 12 is obtained (process "c")

The thus obtained chip element is applied with an alkali metal compound on its surface by a sealed rotary pot (process "d"). The alkali metal compound is not particularly limited, but is a compound capable of dispersing an alkali metal into the element body 12 from the surface by heat treatment, and oxides, hydroxides, chlorides, nitrates, borates, carbonates, and oxalates, etc. of alkali metals are used. By controlling an adding amount of the alkali metal compound, the above ion intensity ratio can be controlled.

Next, the chip element adhered with the alkali metal compound is subjected to heat treatment at a predetermined temperature for a predetermined time in an electric furnace (process "e"). As a result, an alkali metal in the alkali metal compound is dispersed into the chip element from its surface, and an element body 12 being formed a high resistance layer 4 is obtained. The above ion intensity ratio and a thickness of the high resistance layer 4 can be controlled by the temperature and time of the heat treatment at this time. A preferable heat treatment temperature is 700 to 1000° C., and a heat treatment atmosphere is in the air. Also, the heat treatment time is preferably 10 minutes to 4 hours.

Next, terminal electrodes are applied and printed on the both end portions of the element after the heat treatment, and Ag base electrodes are formed (process "f"). Here, Ag is selected as the base electrode material, but any material can be used as far as it is easily printed on the element body 12, easily bonded with materials composing the internal electrode layers 2 and easily plated in a follow-on plating process.

Finally, a Ni plating film and/or a Sn/Pb plating film are formed on the surface of the base electrodes by electric plating (process "g"), so that a multilayer chip varistor 10 is obtained.

Note that the means to diffusing an alkali metal from the surface of the element body 12 is not limited to the above means and, for example, a means below can be applied. Namely, a method of performing heat treatment on the element body 12 before being formed the terminal electrodes 3 in a state of being buried in an alkali supply source, a method of performing heat treatment after uniformly applying with a spray, etc. a liquid alkali supply source to the surface of the element body 12, and a method of performing heat treatment after uniformly applying an air including alkali metal supply source powder to the surface of the element body 12, may be mentioned.

In these methods, an alkali metal diffuses more or less to the exposed end surfaces of the internal electrode layers 2 exposing at the both end portions of the element body 12, but conductivity of the internal electrode layers 2 is not affected thereby.

Figure 3:
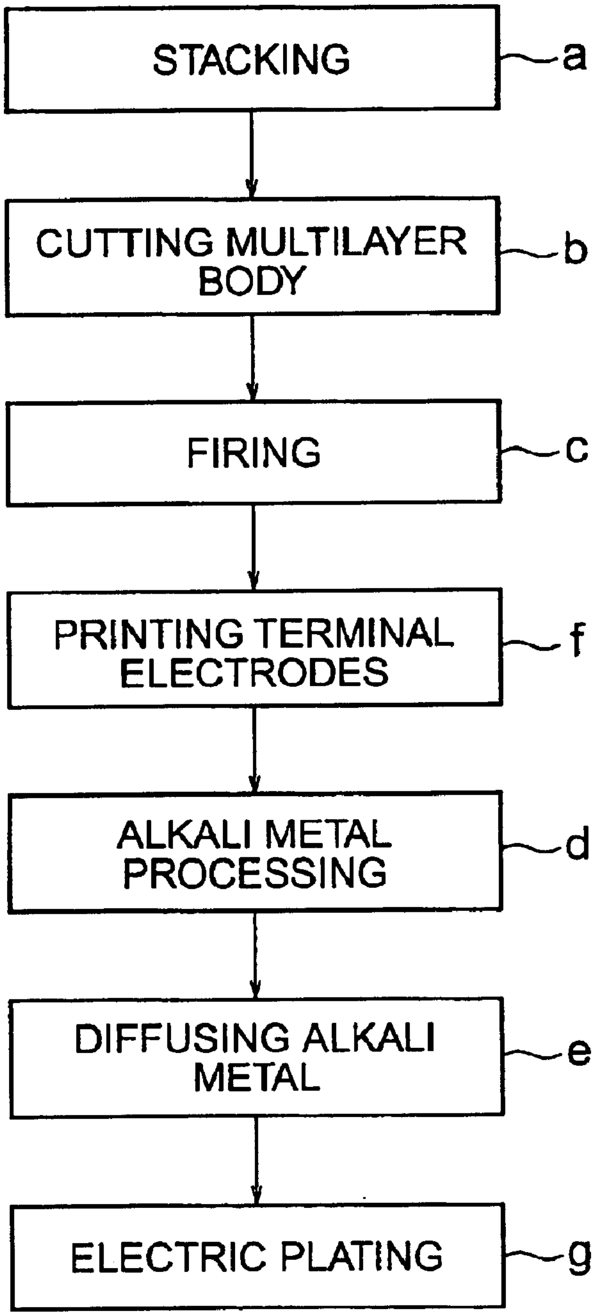
FIG. 3 is a flowchart of a production process of a multilayer chip varistor according to another embodiment of the present invention.

Note that to surely prevent the diffusion of the alkali metal to the exposed end surfaces of the internal electrode layers 2, for example as shown in FIG. 3, formation of the high resistance layer (processes "d" and "e") may come after formation of terminal electrodes (process "f"). In this case, the high resistance layer 4 shown in FIG. 1 is not formed inside of the terminal electrodes 3. Accordingly, an alkali metal does not diffuse from the exposed end surfaces of the internal electrode layers 2. Also, when adhering an alkali metal to the surface and printing after applying and drying the terminal electrodes, diffusion of the alkali metal to the element body can be performed at the same time as the printing, so that the process can be simplified.

Second Embodiment

Figure 4:
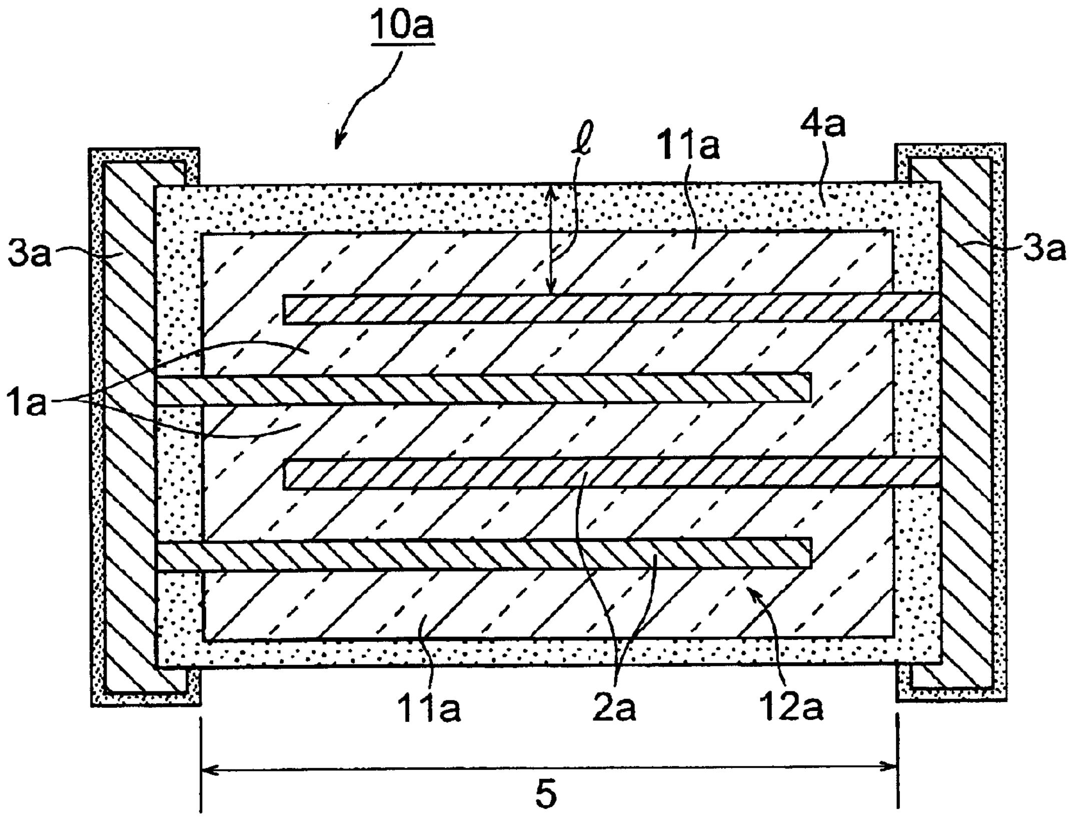
FIG. 4 is a schematic sectional view of a multilayer chip varistor according to an embodiment of the present invention.

As shown in FIG. 4, in a multilayer chip varistor 10*a* as an example of a chip shaped electronic device according to the present embodiment, a pair of external terminal electrodes 3*a* are formed on the outer surface of an element body 12*a* having the configuration of alternately stacking voltage nonlinear resistor layers 1*a* and internal electrode layers 2*a*. In the present embodiment, a distance of the opposing end portions on the same plane (a gap between terminals; corresponding to the reference number 5 in FIG. 4) of the pair of external terminal electrodes 3*a* is 50 μm or more, and the configuration other than that is the same as that in the first embodiment.

The outside of the internal electrode layers 2*a* in the stacking direction is stacked with an outermost layer 11*a* and the internal electrode layer 2*a* is protected. The outermost layer 11*a* is composed of the same material as that of the resistor layer 1*a*.

A shape of the element body 12*a* is not particularly limited and is normally a rectangular parallelepiped. The present embodiment is designated to an element body 12*a* having a micro size, such as (0.6 mm or less, preferably 0.4 mm or less)×(0.3 mm or less, preferably 0.2 mm)×(a thickness of 0.3 mm or less, preferably 0.2 mm or less). Due to the micro size, the thickness of the outermost layer 11*a* is normally made to be less than 100 μm, preferably 90 μm or less in the present invention. Note that the thickness of the outermost layer 11*a* exceeds 100 μm in some cases depending on an interlayer thickness of the resistor layer 1*a* sandwiched by a pair of internal electrode layers 2*a*.

The resistor layer 1*a* (outermost layer 11*a*, as well), the internal electrode layer 2*a* and the external terminal electrode 3*a* are configured in the same way as the resistor layer 1, the internal electrode layer 2 and the external terminal electrode 3 in the first embodiment. Also, the same is applied to a high resistor layer 4*a* formed around the element body 12*a*.

Note that in the present embodiment, in the high resistance layer 4, when assuming that the minimum distance from the outermost side of the internal electrode layers 2 in the stacking direction to the surface of the element body 12 is 1 and measuring the ion intensity ratio of an alkali metal (A) and zinc (Zn), (A/Zn), in a range from the surface of the element body 12 to a depth of (0.9×1) by the SIMS, it becomes $0.001 \leqq (A/Zn) \leqq 500$.

The alkali metal dispersed in the high resistance layer 4 is preferably at least one of Li, Na, K, Rb and Cs, further preferably Li.

When the alkali metal is Li, the ion intensity ratio of Li and Zn, (Li/Zn), is preferably $0.001 \leqq (Li/Zn) \leqq 500$, more preferably $0.01 \leqq (Li/Zn) \leqq 500$.

When the alkali metal is Na, the ion intensity ratio of Na and Zn, (Na/Zn), is preferably $0.001 \leqq (Na/Zn) \leqq 100$, more preferably, $0.01 \leqq (Na/Zn) \leqq 100$.

When the alkali metal is K, the ion intensity ratio of K and Zn, (K/Zn), is preferably $0.001 \leqq (K/Zn) \leqq 100$, more preferably $0.01 \leqq (K/Zn) \leqq 100$.

When the alkali metal is Rb, the ion intensity ratio of Rb and Zn, (Rb/Zn), is preferably $0.001 \leqq (Rb/Zn) \leqq 100$, more preferably $0.01 \leqq (Rb/Zn) \leqq 100$.

When the alkali metal is Cs, the ion intensity ratio of Cs and Zn, (Cs/Zn), is preferably $0.001 \leqq (Cs/Zn) \leqq 100$, more preferably $0.1 \leqq (Cs/Zn) \leqq 100$.

When the ion intensity ratio is too small, an insulation resistance value after reflow soldering tends to be too low, while when the ion intensity ratio is too large, electric characteristics of the voltage nonlinear resistor layer 1 may be adversely affected and an increase of the insulation resistance value after reflow soldering tends to decline.

A method of producing the multilayer chip varistor 10*a* may be the same as that in the case of producing the varistor 10 in the first embodiment.

Other Embodiments

Note that the present invention is not limited to the above embodiments and a variety of modifications can be made within the scope of the present invention.

EXAMPLES

Below, the present invention will be explained based on further detailed examples, but the present invention is not limited to these examples.

Example 1

A chip element to be an element body 12 having a 1608 shape (outer dimensions: 1.6 mm×0.8 mm×0.8 mm) was formed by following the processes "a" to "c" shown in FIG. 2 and a normal method. Note that a nonlinear resistor layer 1 and the outermost layer 1*a* of the chip element were composed of a zinc oxide material, specifically composed of what obtained by adding by the ratio of 0.5 mol % of Pr, 1.5 mol % of Co, 0.005 mol % of Al, 0.05 mol % of K, 0.1 mol % of Cr, 0.1 mol % of Ca and 0.02 mol % of Si to ZnO of 99.9% purity (99.725 mol %).

Thus obtained chip element was applied with $Li_2CO_3$ powder on its surface by a sealed rotary pot. An average particle diameter of the $Li_2CO_3$ powder was 3 $\mu$m.

Note that an amount of $Li_2CO_3$ was in a range of 0.001 $\mu$g to 10 mg per one element chip. By increasing or decreasing the amount, the later explained samples having different ion intensity ratios can be obtained.

The chip element applied with the $Li_2CO_3$ powder was subjected to heat treatment at a temperature of 700 to 1000° C. for 10 minutes to 4 hours in the air to diffuse Li from the surface of the chip element, and a high resistance layer 4 was formed near the surface. By changing the heat treatment temperature and the heat processing time, the later explained samples having different ion intensity ratios can be obtained.

After that, an Ag base electrode was formed by a normal method, and a Ni plating film and a Sn/Pb plating film were formed on the surface of the base electrode by electric plating to form terminal electrode 3, consequently, a multilayer chip varistor 10 was obtained.

The thus obtained plurality of multilayer chip varistor samples were measured the ion intensity ratio of Li and Zn, (Li/Zn), by a secondary ion mass spectrometry in a range from the surface of the element body to 100 $\mu$m. Also, insulation resistance value before and after reflow soldering were measured and an insulation defective rate was obtained. The results are listed in Table 1.

Note that the reflow soldering was performed by printing cream solder containing a flux on a substrate and mounting the element, then, letting it through a reflow furnace having the peak temperature of 230° C.

The ion intensity ratio of Li/Zn was obtained by taking an average of values up to the depth of 100 $\mu$m by the secondary ion mass spectrometry (SIMS). Also, the insulation resistance value was measured at an application voltage of 3V and obtained from 100 average values, and the insulation defective rate was calculated by presuming elements not reaching 1 MΩ were defective. Note that all elements before the reflow soldering had an insulation resistance of 100 mΩ or more.

TABLE 1

| | | After Reflow Soldering | |
|---|---|---|---|
| Sample No. | Ion Intensity Ratio (Li/Zn) | Insulation Resistance Value MΩ | Defective Rate % |
| *1 | 0.0001 | 0.9 | 87 |
| 2 | 0.001 | 4.8 | 0 |
| 3 | 0.01 | 12 | 0 |
| 4 | 0.1 | 31 | 0 |
| 5 | 1 | 95 | 0 |
| 6 | 10 | 120 | 0 |
| 7 | 100 | 88 | 0 |
| 8 | 500 | 64 | 0 |
| *9 | 1000 | — | unable to produce samples |

The sample number added with the mark "*" is not included in the present invention.

As shown in Table 1, elements having the ion intensity ratio of 0.0001 or less had a small average insulation resistance value of 1 MΩ after reflow and high insulation defective rates after reflow (sample 1). On the other hand, elements having an ion intensity ratio of 0.001 or more and 500 or less had an average insulation resistance value of larger than 4.8 MΩ and the defective rate was all "0" (samples 2 to 8). Particularly, it was confirmed that elements of 0.01 or more and 500 or less had an average insulation resistance value of larger than 12 MΩ, which was more preferable. Note that samples having an ion intensity ratio of 1000 or more could not be produced (sample 9).

Also, it was confirmed by other experiment that varistor characteristics (voltage nonlinearity) were not changed before and after Li diffusion processing in the samples 1 to 8.

Example 2

Other than using $Na_2CO_3$ instead of $Li_2CO_3$, elements were produced under the same conditions as those in the example 1. The results are listed in Table 2.

TABLE 2

| | | After Reflow Soldering | |
|---|---|---|---|
| Sample No. | Ion Intensity Ratio (Na/Zn) | Insulation Resistance Value MΩ | Defective Rate % |
| *10 | 0.0001 | 0.6 | 100 |
| 11 | 0.001 | 3.6 | 5 |
| 12 | 0.01 | 10 | 0 |
| 13 | 0.1 | 25 | 0 |
| 14 | 1 | 76 | 0 |
| 15 | 10 | 105 | 0 |
| 16 | 100 | 95 | 0 |
| *17 | 500 | — | unable to produce samples |

The sample numbers added with the mark "*" are not included in the present invention.

As shown in Table 2, elements having an ion intensity ratio of 0.0001 or less had a low insulation resistance value of 1 MΩ or less after reflow, and an insulation defective rate after reflow was also high (sample 10). On the other hand, elements having an ion intensity ratio of 0.001 or more and 100 or less had an average insulation resistance value of larger than 3.6 MΩ and the defective rate was 5% or less (samples 11 to 16). Particularly, it was confirmed that the elements of 0.01 or more and 100 or less had an average insulation resistance value of larger than 10 MΩ, which was more preferable. Note that samples having an ion intensity ratio of 500 or more could not be produced (sample 17).

Also, it was confirmed by other experiment that varistor characteristics (voltage nonlinearity) were not changed before and after Na diffusion processing in the samples 10 to 16.

Example 3

Other than using $K_2CO_3$ instead of $Li_2CO_3$, elements were produced under the same conditions as those in the example 1. The results were listed in Table 3.

TABLE 3

| | | After Reflow Soldering | |
|---|---|---|---|
| Sample No. | Ion Intensity Ratio (K/Zn) | Insulation Resistance Value MΩ | Defective Rate % |
| *18 | 0.0001 | 0.7 | 100 |
| 19 | 0.001 | 11 | 0 |
| 20 | 0.01 | 21 | 0 |
| 21 | 0.1 | 36 | 0 |
| 22 | 1 | 150 | 0 |
| 23 | 10 | 250 | 0 |
| 24 | 100 | 230 | 0 |
| *25 | 500 | — | unable to produce samples |

The sample numbers added with the mark "*" are not included in the present invention.

As shown in Table 3, elements having an ion intensity ratio of 0.0001 or less had a low insulation resistance value of 1 MΩ or less after reflow, and an insulation defective rate after reflow was also high (sample 18). On the other hand, elements having an ion intensity ratio of 0.001 or more and 100 or less had an average insulation resistance value of larger than 11 MΩ and the defective rate after reflow was 0% (samples 19 to 24). Particularly, it was confirmed that the elements of 0.01 or more and 100 or less had an average insulation resistance value of larger than 21 MΩ, which was more preferable. Note that samples having an ion intensity ratio of 500 or more could not be produced (sample 25).

Also, it was confirmed by other experiment that varistor characteristics (voltage nonlinearity) were not changed before and after K diffusion processing in the samples 18 to 24.

Example 4

Other than using $Rb_2CO_3$ instead of $Li_2CO_3$, elements were produced under the same conditions as those in the example 1. The results were listed in Table 4.

TABLE 4

| | | After Reflow Soldering | |
|---|---|---|---|
| Sample No. | Ion Intensity Ratio (Rb/Zn) | Insulation Resistance Value MΩ | Defective Rate % |
| *26 | 0.0001 | 0.6 | 100 |
| *27 | 0.001 | 0.7 | 65 |
| 28 | 0.01 | 3.5 | 3 |
| 29 | 0.1 | 12 | 0 |
| 30 | 1 | 43 | 0 |
| 31 | 10 | 85 | 0 |
| 32 | 100 | 66 | 0 |
| *33 | 500 | — | unable to produce samples |

The sample numbers added with the mark "*" are not included in the present invention.

As shown in Table 4, elements having an ion intensity ratio of 0.001 or less had a low insulation resistance value of 1 MΩ or less after reflow, and an insulation defective rate after reflow was also high (samples 26 and 27). On the other hand, elements having an ion intensity ratio of 0.01 or more and 100 or less had an average insulation resistance value of larger than 3.5 MΩ and a defective rate after reflow was 3% or less (samples 28 to 32). Particularly, it was confirmed that the elements of 0.1 or more and 100 or less had an average insulation resistance value of larger than 12 MΩ, which was more preferable. Note that samples having an ion intensity ratio of 500 or more could not be produced (sample 33).

Also, it was confirmed by other experiment that varistor characteristics (voltage nonlinearity) were not changed before and after Rb diffusion processing in the samples 26 to 32.

Example 5

Other than using $Cs_2CO_3$ instead of $Li_2CO_3$, elements were produced under the same conditions as those in the example 1. The results were listed in Table 5.

TABLE 5

| Sample No. | Ion Intensity Ratio (Cs/Zn) | After Reflow Soldering: Insulation Resistance Value MΩ | After Reflow Soldering: Defective Rate % |
|---|---|---|---|
| *34 | 0.0001 | 0.6 | 100 |
| *35 | 0.001 | 0.7 | 90 |
| *36 | 0.01 | 2.1 | 45 |
| 37 | 0.1 | 10 | 0 |
| 38 | 1 | 30 | 0 |
| 39 | 10 | 78 | 0 |
| 40 | 100 | 36 | 0 |
| *41 | 500 | — | unable to produce samples |

The sample numbers added with the mark "*" are not included in the present invention.

As shown in Table 5, elements having an ion intensity ratio of 0.01 or less had a low insulation resistance value of 2.1 MΩ or less after reflow, and an insulation defective rate after reflow was also high (samples 34 to 36). On the other hand, elements having an ion intensity ratio of 0.1 or more and 100 or less had an average insulation resistance value of larger than 10 MΩ and a defective rate after reflow was 0% (samples 37 to 40). Particularly, it was confirmed that the elements of 1 or more and 100 or less had an average insulation resistance value of larger than 30 MΩ, which was more preferable. Note that samples having an ion intensity ratio of 500 or more could not be produced (sample 41).

Also, it was confirmed by other experiment that varistor characteristics (voltage nonlinearity) were not changed before and after Cs diffusion processing in the samples 34 to 40.

Comparative Example 1

Other than omitting a process of applying $Li_2CO_3$ to perform heat treatment, elements were produced under the same conditions as those in the example 1.

Thus obtained elements had an insulation resistance of 100 MΩ or more before reflow but becomes 0.6 MΩ after reflow, and the insulation defective rate after reflow was 100%.

Example 6

Chip elements to be an element body 12 having a 0603 shape (outer dimensions: 0.6 mm×0.3 mm×0.3 mm) were formed by following the processes "a" to "c" shown in FIG. 2 and a normal method. An amount of $Li_2CO_3$ was in a range of 0.01 μg to 10 mg per one chip element. A gap between terminals 5 was changed to 5 different kinds (20 μm, 50 μm, 100 μm, 300 μm and 500 μm) for producing. Other than that, multilayer chip varistor samples were obtained in the same way as in the first embodiment.

The obtained plurality of multilayer chip varistor samples were measured the ion intensity ratio of Li and Zn, (Li/Zn), in a range from the surface of the element body to a depth of (0.9×1) by the secondary ion mass spectrometry. Also, insulation resistance values before and after reflow soldering were measured and insulation defective rates were obtained. The results are listed in Table 6.

The ion intensity ratio of Li/Zn was obtained by taking an average of values from the surface of the element body 12 to the depth of (0.9×1) when assuming that the minimum distance from the outermost side of the internal electrode layers 2 in the stacking direction to the surface of the element body 12 is 1. The insulation resistance value and the insulation defective rate were obtained in the same way as in the first embodiment and evaluated in the same way.

TABLE 6

| Sample No. | Gap Between Terminals μm | Ion Intensity Ratio (Li/Zn) | After Reflow Soldering: Insulation Resistance Value MΩ | After Reflow Soldering: Defective Rate % |
|---|---|---|---|---|
| *1a | 20 | —(Untreated) | 0.02 | 100 |
| *2a | | 0.0001 | 0.1 | 100 |
| *3a | | 0.001 | 0.12 | 100 |
| *4a | | 0.01 | 0.1 | 100 |
| *5a | | 0.1 | 0.13 | 100 |
| *6a | | 1 | 0.09 | 100 |
| *7a | | 10 | 0.36 | 98 |
| *8a | | 100 | 0.26 | 100 |
| *9a | | 500 | 0.07 | 100 |
| *10a | | 1000 | — | unable to produce samples |
| *11a | 50 | —(Untreated) | 0.09 | 100 |
| *12a | | 0.0001 | 0.53 | 90 |
| 13a | | 0.001 | 3.8 | 0 |
| 14a | | 0.01 | 11 | 0 |
| 15a | | 0.1 | 21 | 0 |
| 16a | | 1 | 44 | 0 |
| 17a | | 10 | 100 | 0 |
| 18a | | 100 | 31 | 0 |
| 19a | | 500 | 16 | 0 |
| *20a | | 1000 | — | unable to produce samples |
| *21a | 100 | —(Untreated) | 0.11 | 100 |
| *22a | | 0.0001 | 0.77 | 87 |
| 23a | | 0.001 | 4.3 | 0 |
| 24a | | 0.01 | 27 | 0 |
| 25a | | 0.1 | 67 | 0 |
| 26a | | 1 | 120 | 0 |
| 27a | | 10 | 210 | 0 |
| 28a | | 100 | 110 | 0 |
| 29a | | 500 | 38 | 0 |
| *30a | | 1000 | — | unable to produce samples |
| *31a | 300 | —(Untreated) | 0.1 | 100 |
| *32a | | 0.0001 | 0.81 | 82 |
| 33a | | 0.001 | 4.2 | 0 |
| 34a | | 0.01 | 15 | 0 |
| 35a | | 0.1 | 58 | 0 |
| 36a | | 1 | 160 | 0 |
| 37a | | 10 | 250 | 0 |
| 38a | | 100 | 180 | 0 |
| 39a | | 500 | 53 | 0 |
| *40a | | 1000 | — | unable to produce samples |
| *41a | 500 | —(Untreated) | 0.12 | 100 |
| *42a | | 0.0001 | 0.9 | 65 |
| 43a | | 0.001 | 4.5 | 0 |
| 44a | | 0.01 | 21 | 0 |
| 45a | | 0.1 | 55 | 0 |
| 46a | | 1 | 98 | 0 |
| 47a | | 10 | 260 | 0 |
| 48a | | 100 | 210 | 0 |
| 49a | | 500 | 78 | 0 |
| *50a | | 1000 | — | unable to produce samples |

The sample numbers added with the mark "*" are not included in the present invention.

As shown in Table 6, elements before Li processing had a small average insulation resistance value of less than 1 MΩ after reflow, and the insulation defective rate was high as 100% after reflow (samples 1a, 11a, 21a, 31a and 41a).

Elements having a gap between terminals of 20 μm had a small average insulation resistance value of less than 1 MΩ after reflow, and the insulation defective rate after reflow was high as 98% or more (samples 2a to 9a). It was considered that the reason why the insulation defective rate was not improved was that only several ZnO crystal grain boundaries contributing to making resistance between gaps high existed, and that a chance of generating a path of declining the resistance increased.

Elements having the ion intensity ratio of 0.0001 or less had a small average insulation resistance value of less than 1 MΩ after reflow, and the insulation defective rate after reflow was high as 65% or more even when subjected to Li processing (samples 12a, 22a, 32a and 42a).

Elements having a gap between terminals of 50 μm or more and the ion intensity rate of 0.001 or more and 500 or less had an average insulation resistance value of 3.8 MΩ or more, and there was no element exhibiting less than 1 MΩ, moreover, the defective rate was all "0" (samples 13a to 19a, 23a to 29a, 33a to 39a and 43a to 49a). Particularly, it was confirmed that elements of 0.01 or more and 500 or less had an average insulation resistance value of 10 MΩ or more, which was more preferable.

In the present embodiment, it was confirmed that electric characteristics of the varistor samples were not affected by the resistance getting high due to Li diffusion. As a result, high reliability can be secured.

Note that samples having the ion intensity ratio of 1000 or more could not be produced (samples 10a, 20a, 30a, 40a and 50a). Also, in samples 2a to 9a, 12a to 19a, 22a to 29a, 32a to 39a and 42a to 49a, it was confirmed by other experiment that the varistor characteristics (voltage nonlinearity) did not change before and after Li dispersion processing.

Example 7

Other than using $Na_2CO_3$ instead of $Li_2CO_3$, elements were produced in the same way as in the Example 6. the results are listed in Table 7.

TABLE 7

| | | | After Reflow Soldering | |
|---|---|---|---|---|
| Sample No. | Gap Between Terminals μm | Ion Intensity Ratio (Na/Zn) | Insulation Resistance Value MΩ | Defective Rate % |
| *51a | 20 | —(Untreated) | 0.02 | 100 |
| *52a | | 0.0001 | 0.1 | 100 |
| *53a | | 0.001 | 0.09 | 100 |
| *54a | | 0.01 | 0.12 | 100 |
| *55a | | 0.1 | 0.11 | 100 |
| *56a | | 1 | 0.15 | 100 |
| *57a | | 10 | 0.21 | 100 |
| *58a | | 100 | 0.2 | 100 |
| *59a | | 500 | — | unable to produce samples |
| *60a | | 1000 | — | unable to produce samples |
| *61a | 50 | —(Untreated) | 0.09 | 100 |
| *62a | | 0.0001 | 0.29 | 100 |
| 63a | | 0.001 | 3.3 | 4 |
| 64a | | 0.01 | 9 | 0 |
| 65a | | 0.1 | 18 | 0 |
| 66a | | 1 | 36 | 0 |
| 67a | | 10 | 75 | 0 |
| 68a | | 100 | 33 | 0 |
| *69a | | 500 | — | unable to produce samples |
| *70a | | 1000 | — | unable to produce samples |
| *71a | 100 | —(Untreated) | 0.11 | 100 |
| *72a | | 0.0001 | 0.36 | 100 |
| 73a | | 0.001 | 5.1 | 0 |
| 74a | | 0.01 | 13 | 0 |
| 75a | | 0.1 | 29 | 0 |
| 76a | | 1 | 45 | 0 |
| 77a | | 10 | 170 | 0 |
| 78a | | 100 | 74 | 0 |
| *79a | | 500 | — | unable to produce samples |
| *80a | | 1000 | — | unable to produce samples |
| *81a | 300 | —(Untreated) | 0.1 | 100 |
| *82a | | 0.0001 | 0.38 | 100 |
| 83a | | 0.001 | 5 | 0 |
| 84a | | 0.01 | 12 | 0 |
| 85a | | 0.1 | 29 | 0 |
| 86a | | 1 | 56 | 0 |
| 87a | | 10 | 190 | 0 |
| 88a | | 100 | 70 | 0 |
| *89a | | 500 | — | unable to produce samples |
| *90a | | 1000 | — | unable to produce samples |
| *91a | 500 | —(Untreated) | 0.12 | 100 |
| *92a | | 0.0001 | 0.26 | 100 |
| 93a | | 0.001 | 5.2 | 0 |
| 94a | | 0.01 | 16 | 0 |
| 95a | | 0.1 | 31 | 0 |
| 96a | | 1 | 46 | 0 |
| 97a | | 10 | 160 | 0 |
| 98a | | 100 | 72 | 0 |
| *99a | | 500 | — | unable to produce samples |
| *100a | | 1000 | — | unable to produce samples |

The sample numbers added with the mark "*" are not included in the present invention.

As shown in Table 7, elements before Na processing had a small average insulation resistance value of less than 1 MΩ after reflow, and the insulation defective rate after reflow was high as 100% (samples 51a, 61a, 71a, 81a and 91a).

Elements wherein a gap between terminals was 20 μm had a small average insulation resistance value of less than 1 MΩ after reflow, and the insulation defective rate after reflow was high as 100% even when subjected to Na processing (samples 52a to 58a). It was considered that the reason why the insulation defective rate was not improved was the same as that in the above example 6.

Elements having the ion intensity ratio of 0.0001 or less had a small average insulation resistance value of less than 1 MΩ after reflow, and the insulation defective rate after reflow was high as 100% (samples 62a, 72a, 82a and 92a).

Elements having a gap between terminals of 50 μm and the ion intensity ratio of 0.001 or more and 100 or less had an average insulation resistance value of 3.3 MΩ or more, and there was no element exhibiting less than 1 MΩ, moreover, the defective rate was 4% or less (samples 63a to 68a, 73a to 78a, 83a to 88a and 93a to 98a). Particularly, it was confirmed that elements of 0.01 or more and 100 or less had an average insulation resistance value of 10 MΩ or more, which was more preferable.

In the present embodiment, it was confirmed that electric characteristics of the varistor samples were not affected by the resistance getting high due to Na diffusion. As a result, high reliability can be secured.

Note that samples having the ion intensity ratio of 500 or more could not be produced (samples 59a, 60a, 69a, 70a, 79a, 80a, 89a, 90a, 99a and 100a). Also, in samples 52a to 58a, 62a to 68a, 72a to 78a, 82a to 88a and 92a to 98a, it was confirmed by other experiment that the varistor characteristics (voltage nonlinearity) did not change.

Example 8

Other than using $K_2CO_3$ instead of $Li_2CO_3$, elements were produced in the same way as that in the Example 6. The results are listed in Table 8.

TABLE 8

| Sample No. | Gap Between Terminals μm | Ion Intensity Ratio (K/Zn) | After Reflow Soldering: Insulation Resistance Value MΩ | After Reflow Soldering: Defective Rate % |
|---|---|---|---|---|
| *101a | 20 | —(Untreated) | 0.02 | 100 |
| *102a | | 0.0001 | 0.08 | 100 |
| *103a | | 0.001 | 0.13 | 100 |
| *104a | | 0.01 | 0.2 | 100 |
| *105a | | 0.1 | 0.14 | 100 |
| *106a | | 1 | 0.13 | 100 |
| *107a | | 10 | 0.16 | 100 |
| *108a | | 100 | 0.018 | 100 |
| *109a | | 500 | — | unable to produce samples |
| *110a | | 1000 | — | unable to produce samples |
| *111a | 50 | —(Untreated) | 0.09 | 100 |
| *112a | | 0.0001 | 0.11 | 100 |
| 113a | | 0.001 | 4.1 | 2 |
| 114a | | 0.01 | 8.5 | 0 |
| 115a | | 0.1 | 12 | 0 |
| 116a | | 1 | 26 | 0 |
| 117a | | 10 | 49 | 0 |
| 118a | | 100 | 36 | 0 |
| *119a | | 500 | — | unable to produce samples |
| *120a | | 1000 | — | unable to produce samples |
| *121a | 100 | —(Untreated) | 0.11 | 100 |
| *122a | | 0.0001 | 0.2 | 100 |
| 123a | | 0.001 | 5.6 | 0 |
| 124a | | 0.01 | 11 | 0 |
| 125a | | 0.1 | 23 | 0 |
| 126a | | 1 | 33 | 0 |
| 127a | | 10 | 62 | 0 |
| 128a | | 100 | 40 | 0 |
| *129a | | 500 | — | unable to produce samples |
| *130a | | 1000 | — | unable to produce samples |
| *131a | 300 | —(Untreated) | 0.1 | 100 |
| *132a | | 0.0001 | 0.26 | 100 |
| 133a | | 0.001 | 6.5 | 0 |
| 134a | | 0.01 | 12 | 0 |
| 135a | | 0.1 | 21 | 0 |
| 136a | | 1 | 31 | 0 |
| 137a | | 10 | 59 | 0 |
| 138a | | 100 | 40 | 0 |
| *139a | | 500 | — | unable to produce samples |
| *140a | | 1000 | — | unable to produce samples |
| *141a | 500 | —(Untreated) | 0.12 | 100 |
| *142a | | 0.0001 | 0.25 | 100 |
| 143a | | 0.001 | 6.8 | 0 |
| 144a | | 0.01 | 15 | 0 |
| 145a | | 0.1 | 26 | 0 |
| 146a | | 1 | 35 | 0 |
| 147a | | 10 | 61 | 0 |
| 148a | | 100 | 45 | 0 |
| *149a | | 500 | — | unable to produce samples |
| *150a | | 1000 | — | unable to produce samples |

The sample numbers added with the mark "*" are not included in the present invention.

As shown in Table 8, elements before K processing had a small average insulation resistance value of less than 1 MΩ after reflow, and the insulation defective rate after reflow was high as 100% (samples 110a, 111a, 121a, 131a and 141a).

Elements wherein a gap between terminals was 20 μm had a small average insulation resistance value of less than 1 MΩ after reflow, and the insulation defective rate after reflow was high as 100% (samples 102a to 108a). It was considered that the reason why the insulation defective rate was not improved was the same as that in the above example 6.

Elements having the ion intensity ratio of 0.0001 or less had a small average insulation resistance value of less than 1 MΩ after reflow, and the insulation defective rate after reflow was high as 100% (samples 112a, 122a, 132a and 142a).

Elements having a gap between terminals of 50 μm or more and the ion intensity ratio of 0.001 or more and 100 or less had an average insulation resistance value of 4.1 MΩ or more, and there was no element exhibiting less than 1 MΩ, moreover, the defective rate was 2% or less (samples 113a to 118a, 123a to 128a, 133a to 138a and 143a to 148a). Particularly, it was confirmed that elements of 0.01 or more and 100 or less had an average insulation resistance value of 8.5 MΩ or more, which was more preferable.

In the present embodiment, it was confirmed that electric characteristics of the varistor samples were not affected by the resistance getting high due to K diffusion. As a result, high reliability can be secured.

Note that samples having the ion intensity ratio of 500 or more could not be produced (samples 109a, 110a, 119a, 120a, 129a, 130a, 139a, 140a, 149a and 150a). Also, in samples 102a to 108a, 112a to 118a, 122a to 128a, 132a to 138a and 142a to 148a, it was confirmed by other experiment that the varistor characteristics (voltage nonlinearity) did not change before and after K diffusion processing.

Example 9

Other than using $Rb_2CO_3$ instead of $Li_2CO_3$, elements were produced in the same way as in the Example 6. The results are listed in Table 9.

TABLE 9

| Sample No. | Gap Between Terminals μm | Ion Intensity Ratio (Rb/Zn) | After Reflow Soldering: Insulation Resistance Value MΩ | After Reflow Soldering: Defective Rate % |
|---|---|---|---|---|
| *151a | 20 | —(Untreated) | 0.02 | 100 |
| *152a | | 0.0001 | 0.06 | 100 |
| *153a | | 0.001 | 0.09 | 100 |
| *154a | | 0.01 | 0.1 | 100 |
| *155a | | 0.1 | 0.11 | 100 |
| *156a | | 1 | 0.1 | 100 |
| *157a | | 10 | 0.14 | 100 |
| *158a | | 100 | 0.15 | 100 |
| *159a | | 500 | — | unable to produce samples |
| *160a | | 1000 | — | unable to produce samples |
| *161a | 50 | —(Untreated) | 0.09 | 100 |
| *162a | | 0.0001 | 0.1 | 100 |
| 163a | | 0.001 | 0.8 | 85 |
| 164a | | 0.01 | 4.5 | 3 |
| 165a | | 0.1 | 10 | 0 |
| 166a | | 1 | 23 | 0 |

TABLE 9-continued

| Sample No. | Gap Between Terminals μm | Ion Intensity Ratio (Rb/Zn) | After Reflow Soldering Insulation Resistance Value MΩ | Defective Rate % |
|---|---|---|---|---|
| 167a | | 10 | 42 | 0 |
| 168a | | 100 | 37 | 0 |
| *169a | | 500 | — | unable to produce samples |
| *170a | | 1000 | — | unable to produce samples |
| *171a | 100 | —(Untreated) | 0.11 | 100 |
| *172a | | 0.0001 | 0.2 | 100 |
| 173a | | 0.001 | 1.1 | 38 |
| 174a | | 0.01 | 6.9 | 0 |
| 175a | | 0.1 | 17 | 0 |
| 176a | | 1 | 26 | 0 |
| 177a | | 10 | 52 | 0 |
| 178a | | 100 | 40 | 0 |
| *179a | | 500 | — | unable to produce samples |
| *180a | | 1000 | — | unable to produce samples |
| *181a | 300 | —(Untreated) | 0.1 | 100 |
| *182a | | 0.0001 | 0.21 | 100 |
| 183a | | 0.001 | 1.2 | 26 |
| 184a | | 0.01 | 8.3 | 0 |
| 185a | | 0.1 | 22 | 0 |
| 186a | | 1 | 35 | 0 |
| 187a | | 10 | 49 | 0 |
| 188a | | 100 | 46 | 0 |
| *189a | | 500 | — | unable to produce samples |
| *190a | | 1000 | — | unable to produce samples |
| *191a | 500 | —(Untreated) | 0.12 | 100 |
| *192a | | 0.0001 | 0.26 | 100 |
| 193a | | 0.001 | 1.2 | 22 |
| 194a | | 0.01 | 8.1 | 0 |
| 195a | | 0.1 | 23 | 0 |
| 196a | | 1 | 36 | 0 |
| 197a | | 10 | 50 | 0 |
| 198a | | 100 | 50 | 0 |
| *199a | | 500 | — | unable to produce samples |
| *200a | | 1000 | — | unable to produce samples |

The sample numbers added with the mark "*" are not included in the present invention.

As shown in Table 9, elements before Rb processing had a small average insulation resistance value of less than 1 MΩ after reflow, and the insulation defective rate after reflow was high as 100% (samples 151a, 161a, 171a, 181a and 191a).

Elements wherein a gap between terminals was 20 μm had a small average insulation resistance value of less than 1 MΩ after reflow, and the insulation defective rate after reflow was high as 100% even when subjected to Rb processing (samples 152a to 158a). It was considered that the reason why the insulation defective rate was not improved was the same as in the above example 6.

Elements having the ion intensity ratio of 0.0001 or less had a small average insulation resistance value of less than 1 MΩ after reflow, and the insulation defective rate after reflow was high as 100% even when subjected to Rb processing (samples 162a, 172a, 182a and 192a).

Elements having a gap between terminals of 50 μm or more and the ion intensity ratio of 0.001 or more and 100 or less had an average insulation resistance value of 1.1 MΩ or more excepting a sample 163a, and there was no element exhibiting less than 1 MΩ, moreover, the defective rate was 38% or less (samples 164a to 168a, 173a to 178a, 163a to 188a and 193a to 198a). Particularly, it was confirmed that elements of 0.01 or more and 100 or less had an average insulation resistance value of 4.5 MΩ or more, which was more preferable.

In the present embodiment, it was confirmed that electric characteristics of the varistor samples were not affected by the resistance getting high due to Rb diffusion. As a result, high reliability can be secured.

Note that samples having the ion intensity ratio of 500 or more could not be produced (samples 159a, 160a, 169a, 170a, 179a, 180a, 189a, 190a, 199a and 200a). Also, in samples 152a to 158a, 162a to 168a, 172a to 178a, 182a to 188a and 192a to 198a, it was confirmed by other experiment that the varistor characteristics (voltage nonlinearity) did not change before and after the Rb dispersion processing.

Example 10

Other than using $Cs_2CO_3$ instead of $Li_2CO_3$, elements were produced in the same way as in the Example 6. The results are listed in Table 10.

TABLE 10

| Sample No. | Gap Between Terminals μm | Ion Intensity Ratio (Cs/Zn) | After Reflow Soldering Insulation Resistance Value MΩ | Defective Rate % |
|---|---|---|---|---|
| *201a | 20 | —(Untreated) | 0.02 | 100 |
| *202a | | 0.0001 | 0.05 | 100 |
| *203a | | 0.001 | 0.08 | 100 |
| *204a | | 0.01 | 0.06 | 100 |
| *205a | | 0.1 | 0.1 | 100 |
| *206a | | 1 | 0.13 | 100 |
| *207a | | 10 | 0.15 | 100 |
| *208a | | 100 | 0.13 | 100 |
| *209a | | 500 | — | unable to produce samples |
| *210a | | 1000 | — | unable to produce samples |
| *211a | 50 | —(Untreated) | 0.09 | 100 |
| *212a | | 0.0001 | 0.11 | 100 |
| 213a | | 0.001 | 0.65 | 94 |
| 214a | | 0.01 | 1.2 | 45 |
| 215a | | 0.1 | 7.2 | 0 |
| 216a | | 1 | 15 | 0 |
| 217a | | 10 | 26 | 0 |
| 218a | | 100 | 23 | 0 |
| *219a | | 500 | — | unable to produce samples |
| *220a | | 1000 | — | unable to produce samples |
| *221a | 100 | —(Untreated) | 0.11 | 100 |
| *222a | | 0.0001 | 0.12 | 100 |
| 223a | | 0.001 | 0.88 | 68 |
| 224a | | 0.01 | 1.4 | 30 |
| 225a | | 0.1 | 8.6 | 0 |
| 226a | | 1 | 19 | 0 |
| 227a | | 10 | 30 | 0 |
| 228a | | 100 | 28 | 0 |
| *229a | | 500 | — | unable to produce samples |
| *230a | | 1000 | — | unable to produce samples |
| *231a | 300 | —(Untreated) | 0.1 | 100 |
| *232a | | 0.0001 | 0.12 | 100 |
| 233a | | 0.001 | 1.1 | 48 |
| 234a | | 0.01 | 1.7 | 26 |
| 235a | | 0.1 | 10 | 0 |
| 236a | | 1 | 21 | 0 |
| 237a | | 10 | 35 | 0 |

TABLE 10-continued

| Sample No. | Gap Between Terminals μm | Ion Intensity Ratio (Cs/Zn) | After Reflow Soldering Insulation Resistance Value MΩ | After Reflow Soldering Defective Rate % |
|---|---|---|---|---|
| 238a | | 100 | 26 | 0 |
| *239a | | 500 | — | unable to produce samples |
| *240a | | 1000 | — | unable to produce samples |
| *241a | 500 | —(Untreated) | 0.12 | 100 |
| *242a | | 0.0001 | 0.13 | 100 |
| 243a | | 0.001 | 1.5 | 34 |
| 244a | | 0.01 | 2 | 16 |
| 245a | | 0.1 | 13 | 0 |
| 246a | | 1 | 21 | 0 |
| 247a | | 10 | 31 | 0 |
| 248a | | 100 | 22 | 0 |
| *249a | | 500 | — | unable to produce samples |
| *250a | | 1000 | — | unable to produce samples |

The sample numbers added with the mark "*" are not included in the present invention.

As shown in Table 10, elements before Cs processing had a small average insulation resistance value of less than 1 MΩ after reflow, and the insulation defective rate after reflow was high as 100% (samples 201a, 211a, 221a, 231a and 241a).

Elements wherein a gap between terminals was 20 μm had a small average insulation resistance value of less than 1 MΩ after reflow, and the insulation defective rate after reflow was high as 100% even when subjected to Cs processing (samples 202a to 208a). It was considered that the reason why the insulation defective rate was not improved was the same as in the above example 6.

Elements having the ion intensity ratio of 0.0001 or less had a small average insulation resistance value of less than 1 MΩ after reflow, and the insulation defective rate after reflow was high as 100% even when subjected to Cs processing (samples 212a, 222a, 232a and 242a).

Elements having a gap between terminals of 50 μm or more and the ion intensity ratio of 0.001 or more and 100 or less had an average insulation resistance value of 1.1 MΩ or more excepting samples 213a and 223a, and there was no element exhibiting less than 1 MΩ, moreover, the defective rate was 48% or less (samples 214a to 218a, 224a to 228a, 233a to 238a and 243a to 248a). Particularly, it was confirmed that elements of 0.1 or more and 100 or less had an average insulation resistance value of 7.2 MΩ or more, which was more preferable.

In the present embodiment, it was confirmed that electric characteristics of the varistor samples were not affected by the resistance getting high due to Cs diffusion. As a result, high reliability can be secured.

Note that samples having the ion intensity ratio of 500 or more could not be produced (samples 209a, 210a, 219a, 220a, 229a, 230a, 239a, 240a, 249a and 250a). Also, in samples 202a to 208a, 212a to 218a, 222a to 228a, 232a to 238a and 242a to 248a, it was confirmed by other experiment that the varistor characteristics (voltage nonlinearity) did not change before and after the Cs diffusion processing.

Comparative Example 2

Other than omitting a process of applying $Li_2CO_3$ to perform heat treatment, elements wherein a gap between terminals was 500 μm were produced under the same conditions as those in the example 6.

Thus obtained element had an insulation resistance of 100 MΩ or more before reflow but becomes 0.1 MΩ after reflow, and the insulation defective rate after reflow was 100%.

INDUSTRIALLY APPLICABILITY

As explained above, according to the present invention, it is possible to provide a chip shaped electronic device, such as a multilayer chip varistor, not requiring glass coating or other insulative protective layers, being tolerant of temperature changes, capable of maintaining high resistance of an element surface even in reflow soldering, being highly reliable, and capable of being easily produced, and a method of producing the same.

Also according to the present invention, a chip shaped electronic device of a micro size (for example, the size is 0.6 mm or less×0.3 mm or less×a thickness of 0.3 mm or less) having the above characteristics, and a method of producing the same can be provided.

What is claimed is:

1. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of an alkali metal (A) and zinc (Zn), (A/Zn), in a range from the surface of said element body to a depth of (0.9×1) by a secondary ion mass spectrometry, $0.001 \leqq (A/Zn) \leqq 500$.

2. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of Li and Zn, (Li/Zn), in a range from the surface of said element body to a depth of (0.9×1) by a secondary ion mass spectrometry, $0.001 \leqq (Li/Zn) \leqq 500$.

3. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of Na and Zn, (Na/Zn), in a range from the surface of said element body to a depth of (0.9×1) by a secondary ion mass spectrometry, $0.001 \leqq (Na/Zn) \leqq 100$.

4. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of K and Zn, (K/Zn), in a range from the surface of said element body to a depth of (0.9×1) by a secondary ion mass spectrometry, $0.001 \leqq (K/Zn) \leqq 100$.

5. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of Rb and Zn, (Rb/Zn), in a range from the surface of said element body to a depth of (0.9×1) by a secondary ion mass spectrometry, 0.001≦(Rb/Zn)≦100.

6. A chip shaped electronic device comprising an element body including zinc oxide material layers and internal electrode layers, wherein when assuming a minimum distance from an outermost side of said internal electrode layer in the stacking direction to a surface of said element body is 1 and measuring an ion intensity ratio of Cs and Zn, (Cs/Zn), in a range from the surface of said element body to a depth of (0.9×1) by a secondary ion mass spectrometry, 0.001≦(Cs/Zn)≦100.

7. A chip shaped electronic device comprising an element body including zinc oxide material layers and internal electrode layers, wherein when measuring an ion intensity ratio of an alkali metal (A) and zinc (Zn), (A/Zn), in a range from the surface of said element body to a depth of 100 μm by a secondary ion mass spectrometry, it is 0.001≦(A/Zn)≦500.

8. A chip shaped electronic device comprising an element body including zinc oxide material layers and internal electrode layers, wherein when measuring an ion intensity ratio of Li and Zn, (Li/Zn), in a range from the surface of said element body to a depth of 100 μm by a secondary ion mass spectrometry, it is 0.001≦(Li/Zn)≦500.

9. The chip shaped electronic device as set forth in claim 8, wherein said ion intensity ratio is 0.01≦(Li/Zn)≦500.

10. A chip shaped electronic device comprising an element body including zinc oxide material layers and internal electrode layers, wherein when measuring an ion intensity ratio of Na and Zn, (Na/Zn), in a range from the surface of said element body to a depth of 100 μm by a secondary ion mass spectrometry, it is 0.001≦(Na/Zn)≦100.

11. A chip shaped electronic device comprising an element body including zinc oxide material layers and internal electrode layers, wherein when measuring an ion intensity ratio of K and Zn, (K/Zn), in a range from the surface of said element body to a depth of 100 μm by a secondary ion mass spectrometry, it is 0.001≦(K/Zn)≦100.

12. A chip shaped electronic device comprising an element body including zinc oxide material layers and internal electrode layers, wherein when measuring an ion intensity ratio of Rb and Zn, (Rb/Zn), in a range from the surface of said element body to a depth of 100 μm by a secondary ion mass spectrometry, it is 0.01≦(Rb/Zn)≦100.

13. A chip shaped electronic device comprising an element body including zinc oxide material layers and internal electrode layers, wherein when measuring an ion intensity ratio of Cs and Zn, (Cs/Zn), in a range from the surface of said element body to a depth of 100 μm by a secondary ion mass spectrometry, it is 0.1≦(Cs/Zn)≦100.

14. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane (a gap between terminals) is 50 μm or more;

wherein when assuming a minimum distance from an outermost side of said internal electrode layer in the stacking direction to a surface of said element body is 1 and measuring an ion intensity ratio of Li and Zn, (Li/Zn), in a range from the surface of said element body to a depth of (0.9×1) by a secondary ion mass spectrometry (SIMS), it is 0.001≦(Li/Zn)≦500.

15. The chip shaped electronic device as set forth in claim 14, wherein said ion intensity ratio is 0.01≦(Li/Zn)≦500.

16. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of said internal electrode layer in the stacking direction to a surface of said element body is 1 and measuring an ion intensity ratio of Na and Zn, (Na/Zn), in a range from the surface of said element body to a depth of (0.9×1) by a secondary ion mass spectrometry, it is 0.001≦(Na/Zn)≦100.

17. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of said internal electrode layer in the stacking direction to a surface of said element body is 1 and measuring an ion intensity ratio of K and Zn, (K/Zn), in a range from the surface of said element body to a depth of (0.9×1) by a secondary ion mass spectrometry, it is 0.001≦(K/Zn)≦100.

18. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of said internal electrode layer in the stacking direction to a surface of said element body is 1 and measuring an ion intensity ratio of Rb and Zn, (Rb/Zn), in a range from the surface of said element body to a depth of (0.9×1) by a secondary ion mass spectrometry, it is 0.001≦(Rb/Zn)≦100.

19. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

wherein when assuming a minimum distance from an outermost side of said internal electrode layer in the stacking direction to a surface of said element body is 1 and measuring an ion intensity ratio of Cs and Zn, (Cs/Zn), in a range from the surface of said element body to a depth of (0.9×1) by a secondary ion mass spectrometry, it is 0.001≦(Cs/Zn)≦100.

20. A chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μM or more;

wherein when assuming a minimum distance from an outermost side of said internal electrode layer in the stacking direction to a surface of said element body is 1 and measuring an ion intensity ratio of an alkali metal (A) and zinc (Zn), (A/Zn), in a range from the surface of said element body to a depth of (0.9×1) by a secondary ion mass spectrometry, it is 0.001≦(A/Zn)≦500.

21. The chip shaped electronic device as set forth in claim 1, wherein said element body has the configuration of alternately stacking zinc oxide voltage nonlinear resistor layers and internal electrode layers, and said chip shaped electronic device is a multilayer type chip varistor.

22. A method of producing a chip shaped electronic device comprising an element body including zinc oxide material layers and internal electrode layers, and a pair of terminal electrodes formed on an outer surface of the element body, including the steps of:

forming said element body;

diffusing an alkali metal (A) from a surface of said element body to inside the element body; and after that, forming on the outer surface of said element body said pair of terminal electrodes connected to said internal electrode layers;

wherein:

the alkali metal is diffused under a condition of attaining 0.001≦(A/Zn)≦500 when assuming a minimum distance from an outermost layer side of said internal electrode layers in the stacking direction to the surface of said element body is 1 at the time of diffusing said alkali metal and measuring an ion intensity ratio of the alkali metal (A) and zinc (Zn), (A/Zn), in a range from the surface of said element body to a depth of (0.9×1) by a secondary ion mass spectrometry.

23. A method of producing a chip shaped electronic device comprising an element body including zinc oxide material layers and internal electrode layers, and a pair of terminal electrodes formed on an outer surface of the element body, including the steps of:

forming said element body;

forming on the outer surface of said element body terminal electrodes connected to said internal electrode layers; and after that, diffusing an alkali metal (A) from a surface of said element body to inside the element body;

wherein:

the alkali metal is diffused under a condition of attaining 0.001≦(A/Zn)≦500 when assuming a minimum distance from an outermost layer side of said internal electrode layers in the stacking direction to the surface of said element body is 1 at the time of diffusing said alkali metal and measuring an ion intensity ratio of the alkali metal (A) and zinc (Zn), (A/Zn), in a range from the surface of said element body to a depth of (0.9×1) by a secondary ion mass spectrometry.

24. A method of producing a chip shaped electronic device comprising an element body including zinc oxide material layers and internal electrode layers, including the steps of:

forming said element body;

diffusing an alkali metal (A) from a surface of said element body to inside the element body; and after that, forming on the outer surface of said element body terminal electrodes connected to said internal electrode layers; and wherein:

the alkali metal is diffused under a condition of attaining 0.001≦(A/Zn)≦500 when measuring an ion intensity ratio of the alkali metal (A) and zinc (Zn), (A/Zn), in a range from the surface of said element body to a depth of 100 μm by a secondary ion mass spectrometry.

25. A method of producing a chip shaped electronic device comprising an element body including zinc oxide material layers and internal electrode layers, including the steps of:

forming said element body;

forming on the outer surface of said element body terminal electrodes connected to said internal electrode layers; and after that, diffusing an alkali metal (A) from a surface of said element body to inside the element body;

wherein:

the alkali metal is diffused under a condition of attaining 0.001<(A/Zn)<500 when measuring an ion intensity ratio of the alkali metal (A) and zinc (Zn), (A/Zn), in a range from the surface of said element body to a depth of 100 μm by a secondary ion mass spectrometry.

26. A method of producing a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

including the steps of:

forming said element body;

diffusing an alkali metal (A) from a surface of said element body to inside the element body; and after that, forming on the outer surface of said element body said pair of terminal electrodes connected to said internal electrode layers;

wherein:

the alkali metal is diffused under a condition of attaining 0.001<(A/Zn)<500 when assuming a minimum distance from an outermost layer side of said internal electrode layers in the stacking direction to the surface of said element body is 1 at the time of diffusing said alkali metal and measuring an ion intensity ratio of the alkali metal (A) and zinc (Zn), (A/Zn), in a range from the surface of said element body to a depth of (0.9×1) by a secondary ion mass spectrometry.

27. A method of producing a chip shaped electronic device comprising:

an element body including zinc oxide material layers and internal electrode layers and having a size of 0.6 mm or less×0.3 mm or less×a thickness of 0.3 mm or less; and a pair of terminal electrodes formed on an outer surface of the element body, wherein a distance between facing end portions on the same plane is 50 μm or more;

including the steps of:

forming said element body;

forming on the outer surface of said element body said pair of terminal electrodes connected to said internal electrode layers; and after that, diffusing an alkali metal (A) from a surface of said element body to inside the element body;

wherein:

the alkali metal is diffused under a condition of attaining $0.001 \leqq (A/Zn) \leqq 500$ when assuming a minimum distance from an outermost layer side of said internal electrode layers in the stacking direction to the surface of said element body is 1 at the time of diffusing said alkali metal and measuring an ion intensity ratio of the alkali metal (A) and zinc (Zn), (A/Zn), in a range from the surface of said element body to a depth of $(0.9 \times 1)$ by a secondary ion mass spectrometry.

28. The chip shaped electronic device as set forth in claim 22, wherein said alkali metal is at least one of Li, Na, K, Rb and Cs.

29. The chip shaped electronic device as set forth in claim 22, wherein at the time of diffusing said alkali metal, said element body is subjected to heat treatment at a temperature of 700 to 1000° C. in a state of being applied with powder of an alkali metal compound, and at least one of an application amount of said powder to the surface of said element body, a heat treatment temperature and a heat treatment time is controlled.

* * * * *